United States Patent
Yu et al.

(10) Patent No.: US 7,508,920 B1
(45) Date of Patent: Mar. 24, 2009

(54) SCHEDULING OF AUTOMATED TESTS IN A TELECOMMUNICATION SYSTEM

(75) Inventors: Xinhua Yu, Overland Park, KS (US); Dahl Brougham Metters, Shawnee Mission, KS (US); Vincent Perry Watson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 877 days.

(21) Appl. No.: 11/159,580

(22) Filed: Jun. 23, 2005

(51) Int. Cl.
  *H04M 1/24* (2006.01)
  *H04M 3/08* (2006.01)
  *H04M 3/22* (2006.01)

(52) U.S. Cl. .............. 379/9.02; 379/10.01; 379/10.03; 379/27.04

(58) Field of Classification Search ............. 379/1.01, 379/9, 9.01, 9.02, 9.04, 10.01, 10.03, 15.01, 379/22, 26.01, 26.02, 27.04, 29.02, 29.08, 379/29.09; 702/118–123; 324/500
See application file for complete search history.

(56) References Cited

U.S. PATENT DOCUMENTS

| | | | |
|---|---|---|---|
| 4,430,530 A * | 2/1984 | Kandell et al. | 379/29.01 |
| 5,553,058 A | 9/1996 | Glitho | |
| 6,587,543 B1 * | 7/2003 | Howard et al. | 379/10.01 |
| 6,597,773 B2 | 7/2003 | Stanton et al. | |
| 6,795,395 B1 | 9/2004 | Khasnabish | |
| 7,260,184 B1 * | 8/2007 | Howard et al. | 379/9 |
| 2004/0093180 A1 * | 5/2004 | Grey et al. | 702/123 |
| 2004/0264444 A1 | 12/2004 | Kaplan et al. | |

\* cited by examiner

*Primary Examiner*—Quoc D Tran

(57) ABSTRACT

Automated tests are scheduled for a telecommunication network. A time slot array is created and a subset of the time slots are marked as unavailable according to respective maintenance windows. A remainder of the time slots are marked as available. Trunk groups are sequentially selected for respectively scheduling the tests. A particular available time slot is identified in the array for both of the testing units corresponding to the respective trunk group. The slot is marked as unavailable and then each trunk circuit is sequentially selected within the respective trunk group. A respective test is designated for a selected trunk circuit during the particular time slot and a counter is incremented. A check is made whether the counter indicates that a number of the tests have been scheduled that fills a capacity of the testing units for running simultaneous tests. If the capacity is not filled, then the method repeats the designating step for a next selected trunk circuit using the particular time slot. Otherwise, a further time slot marked as available in the array for both of the testing units is found, the further time slot is marked as unavailable, and the designating step is repeated for a next selected trunk circuit using the further time slot.

20 Claims, 5 Drawing Sheets

SCHEDULING OF AUTOMATED TESTS IN A TELECOMMUNICATION SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to maintenance testing of telecommunications network equipment, and, more specifically, to scheduling of tests between large numbers of network nodes using test equipment having multiple channels for conducting a plurality of simultaneous tests.

In order to maintain a high level of quality of service in a telecommunications network, various standard equipment tests have been defined such as those in the Telcordia standard GR-822. In order to quickly identify all malfunctions that may compromise the quality of service, automated testing needs to be thorough and efficient so that all network resources are checked in the least amount of time. A typical telecommunications network has many functioning elements connected in a complex architecture. A nationwide long distance network, for example, may have about fifty switches interconnected by several thousand Intermachine Trunk (IMT) groups. Each IMT consists of many T1 spans (DS-1) and each DS-1 in turn contains 24 trunk circuits (DS-0). Tests that operate at the trunk circuit level (e.g., echo canceller testing) require many thousands of individual automated tests.

Testing units utilized in test the system are standalone devices capable of several different kinds of automated tests. Each testing unit is equipped with one or more T1 cards to handle multiple channels so that it can do many simultaneous tests. In a typical network, at least one respective testing unit is connected to each switch or other node through Automatic Trunk Routing (ATR). Most trunk circuit tests involve both switches connected by the DS-0 line and the individual testing units connected to the switches. Each test typically involves a test call being placed over the trunk circuit, which results in that trunk circuit being unavailable to carry any customer calls during the test. Therefore, tests are scheduled only during predefined "maintenance windows" coinciding with the least busy times for the network. Since switches may be in different geographic locations spanning different time zones, the maintenance windows may not start or end together at both ends of a particular trunk group.

Scheduling of automated tests should make full use of available testing resources. For example, the simultaneous testing capabilities of the testing units should be fully utilized. Scheduling should ensure that there are no conflicts in the assigned tasks. Even though testing may be occurring simultaneously on unrelated trunk groups, tests must be scheduled in such a way that a testing unit is not overloaded and is not directed to perform incompatible tasks. Scheduling must also be achieved in such a way that the ability of the network to meet quality of service performance during testing is not impaired. Due to the complexity of the network interactions and the large number of permutations of potential testing events, prior art scheduling techniques have failed to meet the foregoing goals. Prior art manual scheduling methods have only managed to test about 15% of a 50-switch long distance network in a two week time period. Testing of a full network would have taken even longer.

SUMMARY OF THE INVENTION

The present invention generates a testing schedule that maximizes the use of available testing resources and minimizes the total time required to complete testing while avoiding conflicts in resource assignments and without compromising quality of service when testing is being conducted. The present invention achieves testing of all trunk circuits in a 50-switch long distance network within three days.

In one aspect of the invention, a method is provided for scheduling automated tests in a telecommunication system having a plurality of switches interconnected by a plurality of trunk groups, wherein each trunk group includes a plurality of trunk circuits. A time slot array is created representing a plurality of potentially available time slots for conducting the automated tests between testing units respectively connected to the switches. A subset of the time slots are marked as unavailable according to a plurality of respective maintenance windows corresponding to the switches. A remainder of the time slots are marked as available. Each of the trunk groups are sequentially selected for respectively scheduling the automated tests. A counter is initialized after selecting a respective trunk group. A particular available time slot is identified in the array for both of the testing units corresponding to the respective trunk group. Then this particular time slot is marked as unavailable for both of the corresponding testing units. Each trunk circuit is sequentially selected within the respective trunk group. A respective test is designated for a selected trunk circuit during the particular time slot and the counter is incremented. A check is made whether the counter indicates that a number of the tests have been scheduled that fills a capacity of the testing units for running simultaneous tests. If the capacity is not filled, then the method repeats the designating step for a next selected trunk circuit using the particular time slot. If the capacity is filled, then the method identifies a further time slot marked as available in the array for both of the testing units corresponding to the respective trunk group, marks the further time slot as unavailable for both of the corresponding testing units, and repeats the designating step for a next selected trunk circuit using the further time slot.

DETAILED DESCRIPTION OF PREFERRED EMBODIMENTS

Figure 1:
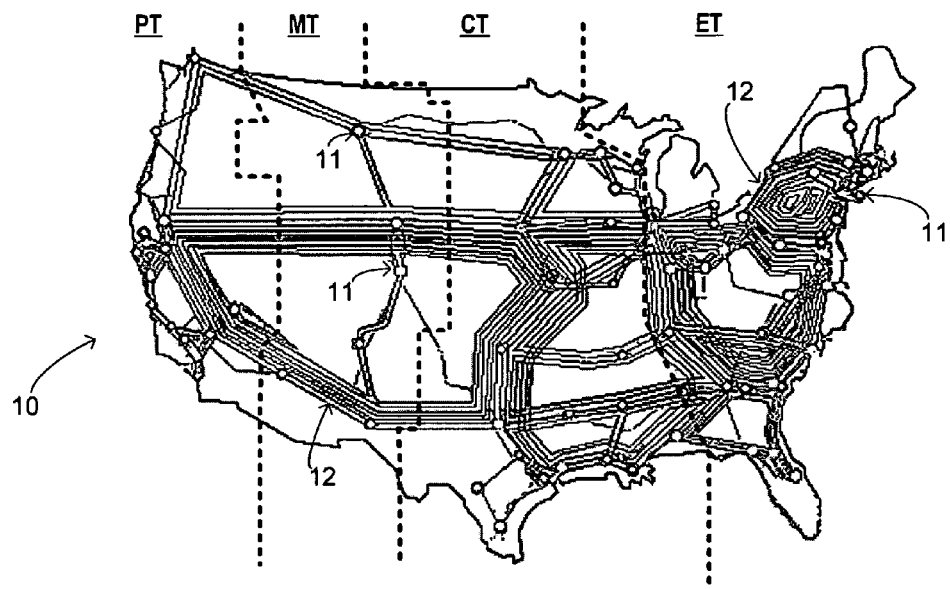
FIG. 1 is a map showing a geographical layout of a telecommunications network to be tested.

FIG. 1 shows a topology for a long distance telephone network 10 including a plurality of switches 11 shown as small circles interconnected by a plurality of trunk groups 12 in the form of fiber optic cables, for example. Network 10 spans the continental United States and its four time zones so that opposite ends of many tandem connections between switches lie in different time zones. Testing of these trunk groups results in tests between testing units that are on different local times. Thus, many tests have to accommodate two different maintenance windows.

Figure 2:
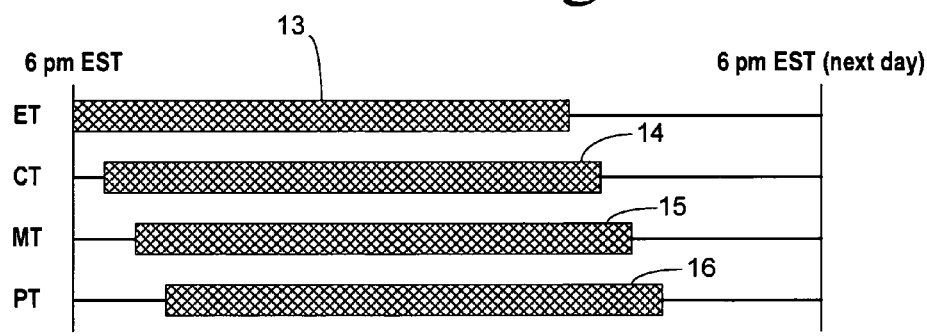
FIG. 2 is a plot showing example maintenance windows for switches located in various time zones.

FIG. 2 illustrates offset maintenance windows as referenced to an absolute time. For example, a maintenance window may be defined in local time from 6:00 p.m. on one day to 10:00 a.m. the next day, thereby avoiding the times of highest network demand. A maintenance window 13 is shown for a switch located in the Eastern time zone. Maintenance windows 14, 15, and 16 (established in local time from 6:00 p.m. to 10:00 a.m. for Central time, Mountain time, and Pacific time, respectively) are offset from the Eastern time zone as shown. Although maintenance windows of equal durations are shown in FIG. 2, the present invention works with any arbitrary maintenance windows of unequal durations and with any number of maintenance windows established for each switch/testing unit combination as long as there are enough overlapping maintenance windows to conduct the necessary testing.

Figure 3:
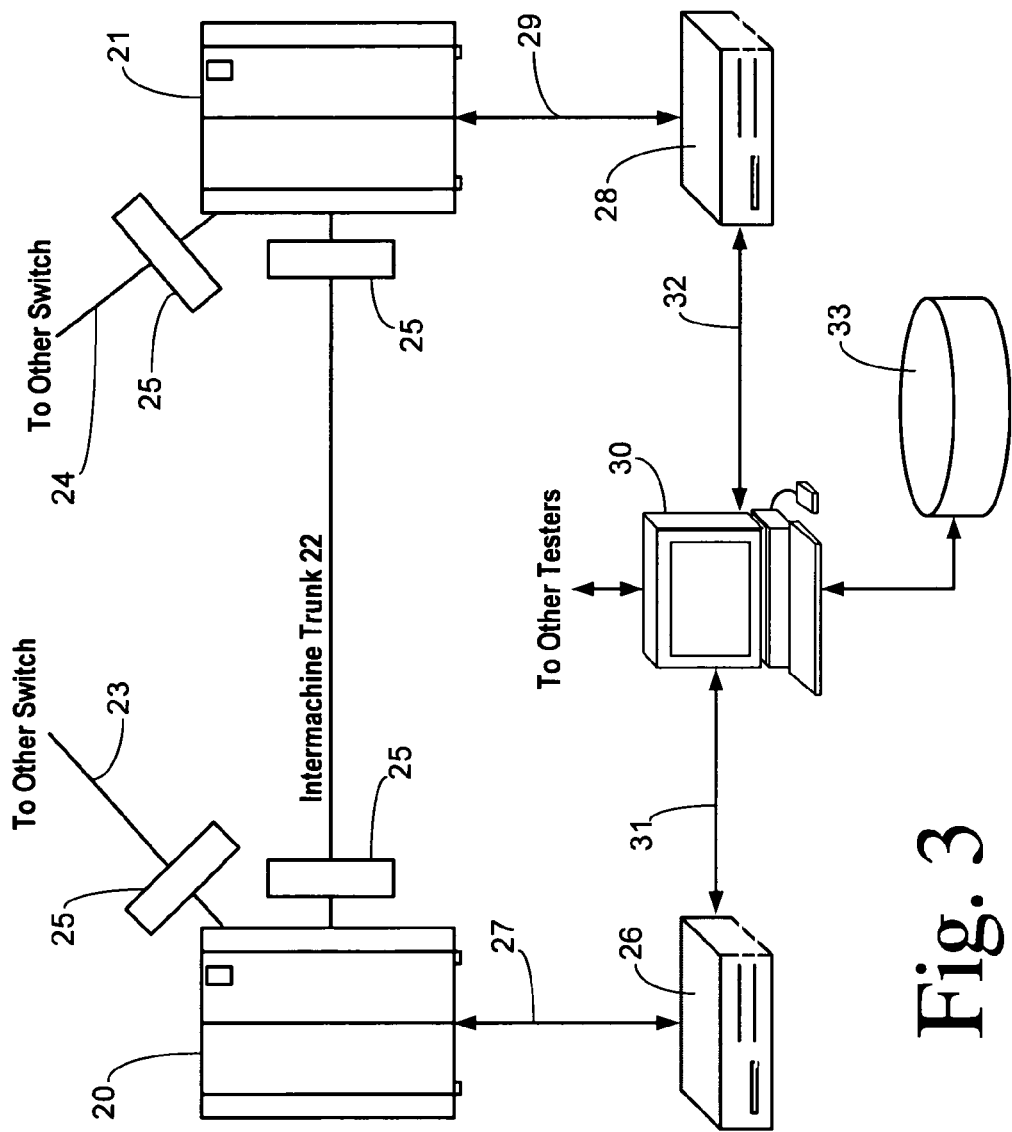
FIG. 3 is a block diagram showing a preferred hardware implementation of the invention.

FIG. 3 shows a telecommunication and testing system of the present invention in greater detail. A switch 20 is interconnected to a switch 21 by an intermachine trunk (IMT) 22. IMT 22 comprises a plurality of trunk circuits (DS-0). Other IMT's 23 and 24 couple switches 20 and 21 to other switches in the network. A plurality of echo cancellers 25 are installed at the end of each intermachine trunk, connected to switches 20 and 21 locally. Echo cancellers are critical to providing high quality of service and their performance must be periodically checked in order to assure proper echo canceling. A testing unit 26 is connected to switch 20 by an ATR trunk 27. Similarly, a testing unit 28 is connected to switch 21 by an ATR trunk 29 and each other switch in the network has an associated testing unit.

Testing units 26 and 28 are coupled to a main controller 30 by links 31 and 32 in a data network maintained by the telecommunications service provider. The data network also connects the other testing units to main controller 30. Main controller 30 determines a testing schedule in conjunction with a database 33 and certain user input. The resulting test schedules are provided from main controller 30 to testing units 26 and 28 as computer files. Test results are relayed back to main controller 30 and may be stored in database 33 together with other network and testing unit information.

Figure 4:
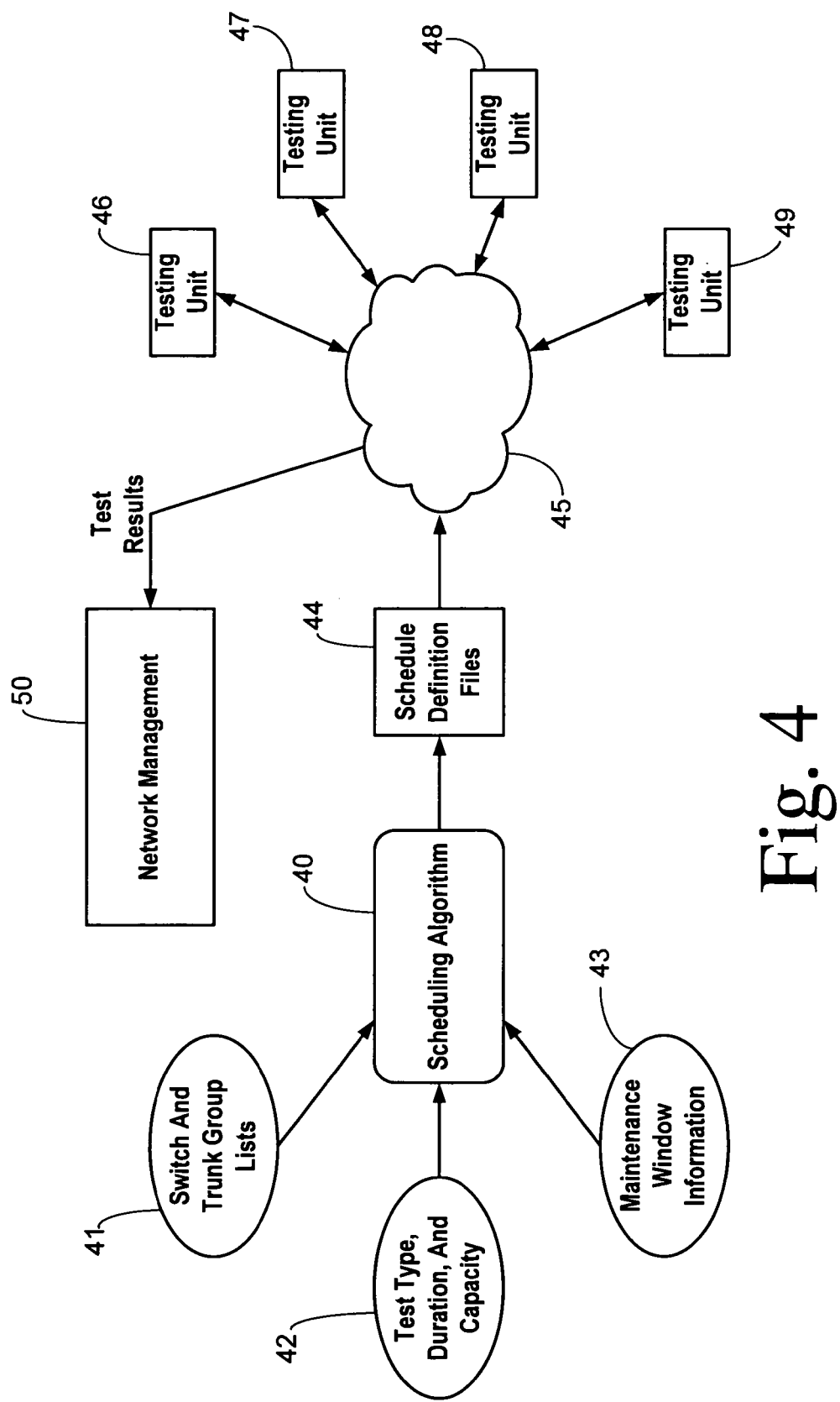
FIG. 4 is a block diagram showing elements of one preferred embodiment in greater detail.

System operation is shown in greater detail in FIG. 4. A scheduling algorithm 40 operates based on switch and trunk group lists 41, test type, duration and capacity information 42, and maintenance window information 43. The lists and information may be obtained from database 33 (FIG. 3) or can be manually provided by a user. Scheduling algorithm 40 generates schedule definition files 44 that are sent via a data network 45 to a plurality of testing units 46-49. Schedule definition files 44 are stored in the respective testing units which then conduct the specified tests at the appropriate times and collect results which are provided to a network management control center 50 to generate trouble tickets for network maintenance technicians to fix the identified problems.

Figure 5:
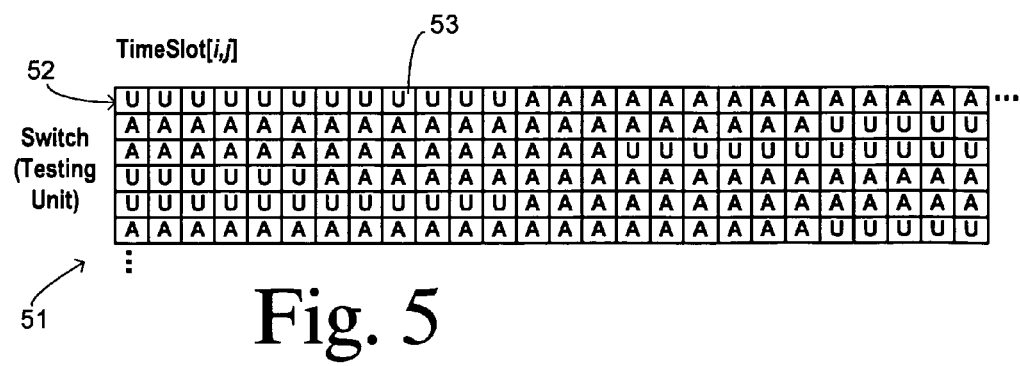
FIG. 5 shows a portion of a time slot array of the invention.

Scheduling according to the present invention utilizes a time slot array 51 as shown in FIG. 5. Each row in array 51 represents a switch testing unit that will be utilized in tests between each respective switch and another switch. Each column in array 51 represents a respective time slot which occurs at a respective time in a reference time zone (e.g., Eastern Time) and has a duration corresponding to the time required to conduct a single individual test of the type of test being scheduled. In the case of conducting an echo canceller test, each individual test may be completed in less than about one minute. Consequently, each time slot may represent a duration of one minute. Array 51 utilizes a pair of indices i and j for identifying a particular time slot on a particular testing unit. Each element in the array is marked or flagged according to whether the corresponding testing unit is available or unavailable at a particular time slot. Available time slots are shown marked with an A and unavailable slots are shown marked with a U. In a software implementation, each time slot may be marked using either a binary or a Boolean value, for example.

In one embodiment, a single array may cover only one day, so that when a test trial is not completed within a single day then multiple time slot arrays are used. Alternatively, the time slot array could have a number of columns spanning a plurality of days. Prior to beginning test scheduling, the time slot array is initialized in order to mark any time slots outside of a maintenance window as unavailable. Thus, in a first row 52 of array 51, a subset of time slots 53 are marked unavailable. It should be noted that multiple maintenance windows may occur and that the actual times of maintenance windows may depend upon the particular day being a weekday or a weekend or holiday and may also depend on other factors which affect call volume in the network. After marking all appropriate subsets of time slots as unavailable in respect of the maintenance windows for each of the switches, a remainder of the time slots are left marked as available (as designated by the array flag A). In attempting to schedule a test between two switches or testing units during a particular time slot, it can be seen that both elements of array 51 in the column corresponding to a potentially available time slot must both be marked with A in order to schedule a test during the time slot.

Figure 6:
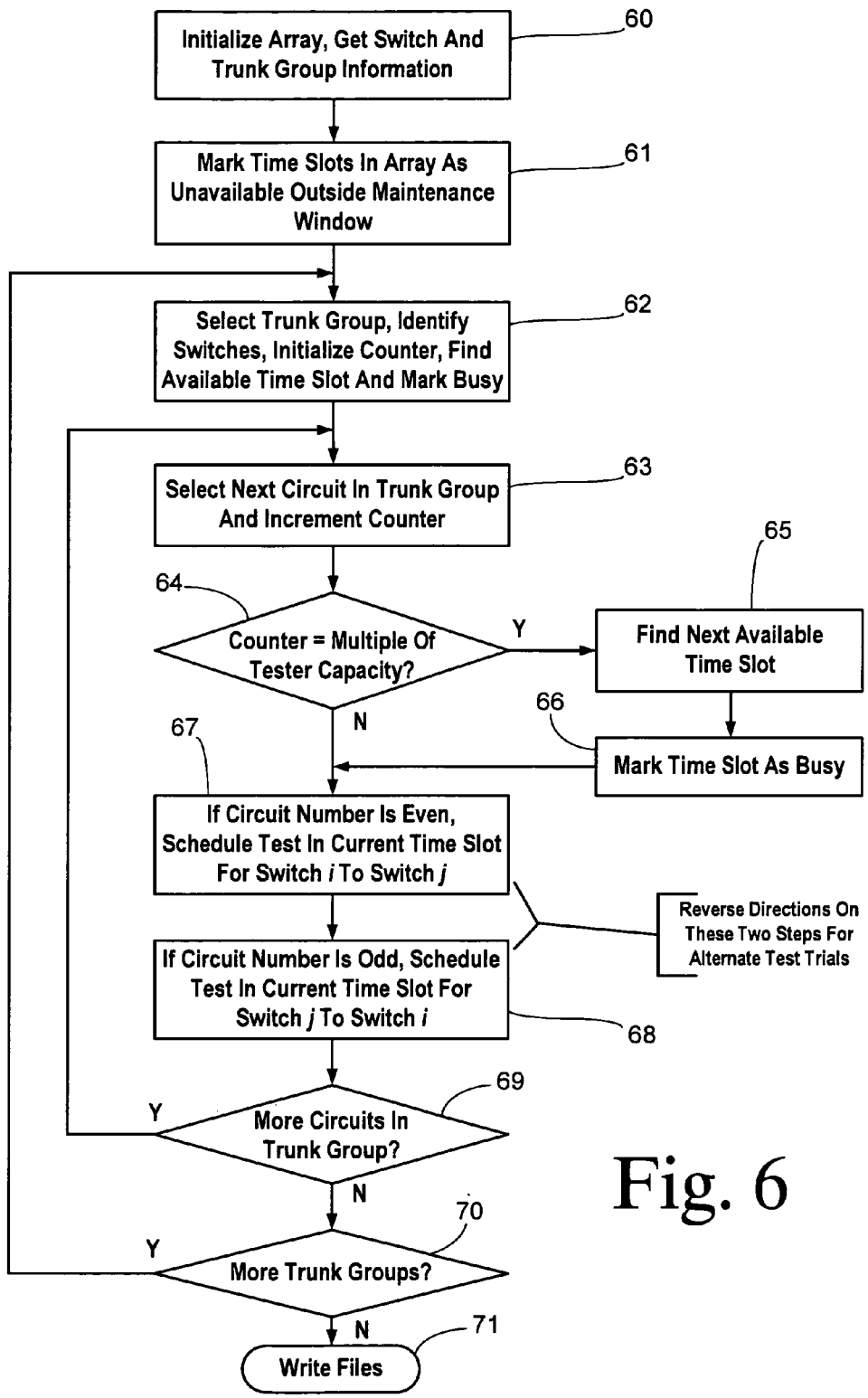
FIG. 6 is a flowchart showing a preferred method for generating schedule definition files.

The overall method of the present invention is shown in greater detail in FIG. 6. In step 60, the time slot array is initialized (e.g., all elements marked as available) and information about the switches and trunk groups in the network is gathered (e.g., from a database or from user input). Switch information preferably includes a definition of maintenance windows for each particular switch. In step 61, time slots in the array outside the maintenance windows of each switch are marked as unavailable. As a result, the remainder of the time slots inside the maintenance windows are marked as available.

In step 62, a trunk group is selected, the switches initiating and terminating the selected trunk group are identified, a counter is initialized (e.g., set to zero), an available time slot is found in the time slot array corresponding to the identified switches, and the available time slot is marked as unavailable or busy. A next trunk circuit in the selected trunk group is selected in step 63 and the counter is incremented.

Standard testing units are capable of handling a predetermined number of simultaneous tests. For example, a particular testing unit such as the Sage 945RTS Remote Test Server available from Sage Instruments is capable of handling 24 simultaneous tests of which half may be originated and half are terminated by the testing device. A check is made in step 64 to determine whether the counter is equal to a multiple of this tester capacity. In other words, a check is made to determine whether the counter indicates that a number of tests have been scheduled that fills the capacity of the testing units for running simultaneous tests during the current time slot. When tester capacity is limited to one-half of test calls being originated by the testing unit and one-half being terminated, then a preferred embodiment of the present invention designates an alternating direction of test calls for the designated tests as described below. When using a testing unit such as the Sage 945RTS with a capacity of 24 simultaneous tests, step 64 determines whether the counter is a multiple of 24. If the counter equals a multiple of the tester capacity (i.e., a time slot has been filled), then a next available time slot is found in step 65. To find a next available time slot, the time slot array may be inspected column by column to find an earliest time for which array elements for the two identified switch testing units are available. Once a further time slot is found, it is marked as unavailable or busy in step 66.

Since half the tests involving each particular testing unit may be originated and half are terminated by the testing unit, the present invention alternates the direction of tests as they are designated within each respective time slot. Thus, in step 67, if a trunk circuit number is even, then a test is scheduled in the current time slot wherein the test call goes from switch i to switch j. On the other hand, if the circuit number is odd, then a test is scheduled in the current time slot from switch j to switch i in step 68. Trunk circuits within a trunk group are typically identified according to consecutive trunk circuit numbers. In the event that trunk circuits are identified in some other manner, then any other method for alternating between test circuits rather than even and odd numbers can be utilized.

A check is performed in step 69 to determine whether there are more trunk circuits in the current trunk group. If so, then a return is made to step 63 to consider the next trunk circuit. If no more trunk circuits remain, then a check is made in step 70 to determine whether there are more trunk groups to be processed. If so, then a return is made to step 62 to select the next trunk group. Otherwise, computer files including all the designated tests events are written in step 71 for storage in the central database and for forwarding to each respective testing unit.

Once the entire network has been tested, a subsequent testing trial will be conducted at some later date in order to recheck the network for problems (e.g., two weeks after the previous testing trial). On alternate trials, the directions for designating test events in step 67 and 68 may be reversed so that each individual trunk circuit is tested in the opposite direction from the previous trial. In other words, if the circuit number is even on an alternate test trial, then tests are scheduled in a current time slot using test calls made from switch j to switch i.

Figure 7:
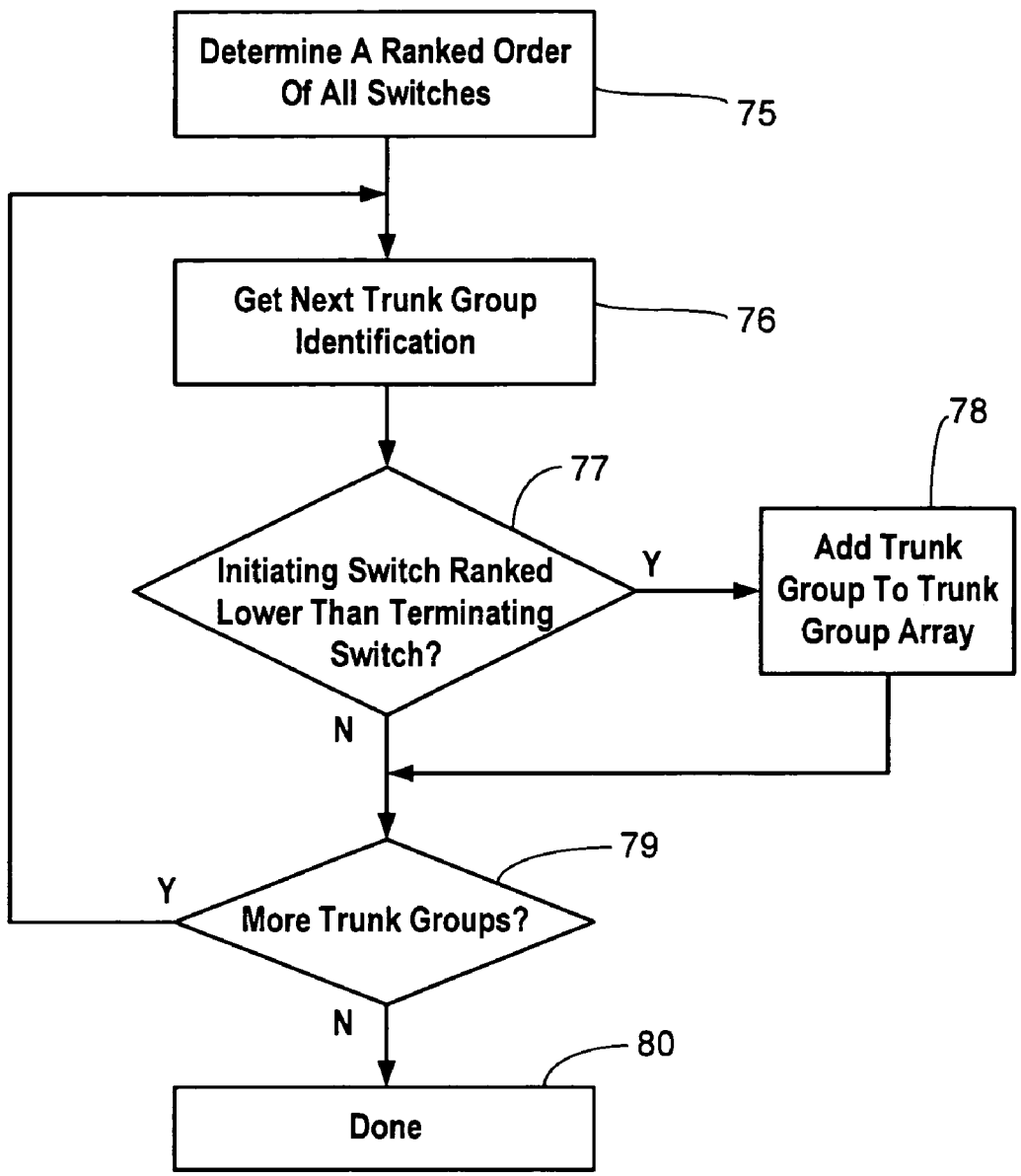
FIG. 7 is a flowchart showing a method for generating a list of unique trunk groups to be tested.

Trunk group information needed in a testing trial may be obtained from all the switches during initialization. For example, the main controller pulls trunk tables from each switch and stores them in the central database before it starts the scheduling process. A trunk group array is compiled which must uniquely include each trunk group only once even though a trunk group will be reported twice by its connected switches. Redundancy in the trunk group array is avoided using the method shown in FIG. 7. In step 75, a rank order of all switches is determined. For example, any alphabetical or numerical order may be utilized. In step 76, a next trunk group identification is retrieved. A check is made in step 77 to determine whether an initiating switch for the trunk is ranked lower than the terminating switch. If so, then the trunk group is added to the trunk array in step 78, otherwise it is not added. Alternatively, a trunk group could be added only when the initiating switch is ranked higher than the terminating switch. In step 79, a check is made to determine whether there are more trunk groups to be examined. If so, then the method returns to step 76. Otherwise, the method is done at step 80.

In some networks, switches may be co-located. For some test types, such as echo testing, trunk groups connecting co-located switches would not be included in the trunk group array since the test would be unnecessary.

What is claimed is:

1. A method of scheduling automated tests in a telecommunication system having a plurality of switches interconnected by a plurality of trunk groups, each trunk group including a plurality of trunk circuits, said method comprising the steps of:

creating a time slot array representing a plurality of potentially available time slots for conducting said automated tests between testing units respectively connected to said switches;

marking a subset of said time slots as unavailable according to a plurality of respective maintenance windows corresponding to said switches;

marking a remainder of said time slots as available;

sequentially selecting each of said trunk groups for respectively scheduling said automated tests;

initializing a counter after selecting a respective trunk group;

identifying a particular time slot marked as available in said array for both of said testing units corresponding to said respective trunk group;

marking said particular time slot as unavailable for both of said corresponding testing units;

sequentially selecting each trunk circuit within said respective trunk group;

designating a respective test for a selected trunk circuit during said particular time slot;

incrementing said counter;

checking whether said counter indicates that a number of said tests have been scheduled that fills a capacity of said testing units for running simultaneous tests;

if said capacity is not filled, then repeating said designating step for a next selected trunk circuit using said particular time slot; and if said capacity is filled, then identifying a further time slot marked as available in said array for both of said testing units corresponding to said respective trunk group, marking said further time slot as unavailable for both of said corresponding testing units, and repeating said designating step for a next selected trunk circuit using said further time slot.

2. The method of claim 1 wherein said switches are located in a plurality of time zones, wherein said time slots in said time slot array are organized according to an absolute time reference, and wherein said maintenance windows appear in said time slot array in accordance with a time zone where each particular switch is located.

3. The method of claim 1 wherein said step of designating a respective test includes designating an originating testing unit.

4. The method of claim 3 wherein said originating testing unit is alternately designated between each of said testing units corresponding to said respective trunk group when designating said respective tests for said trunk circuits within said selected trunk group.

5. The method of claim 1 wherein said trunk circuits within said respective trunk group are identified by substantially consecutive trunk circuit numbers, and wherein said step of designating a respective test includes designating a test direction between said testing units that is determined in response to a trunk circuit number being even or odd.

6. The method of claim 5 wherein said test direction comprises a first direction when a respective trunk circuit number is even and a second direction opposite said first direction when a respective trunk circuit number is odd.

7. The method of claim 6 wherein a repeat scheduling of automated tests for all of said trunk groups is performed for a time slot array covering a later date, and wherein said test direction for said repeat scheduling is comprised of said first direction when a respective trunk circuit number is odd and said second direction when a respective trunk circuit number is even.

8. The method of claim 1 wherein said trunk groups are selected from a trunk group array, said method further comprising the steps of:
- determining a ranked order of said switches;
- collecting identities of all trunk groups coupled from a switch of a lower ranked order to a switch of a higher ranked order; and
- adding each collected trunk group identity to said trunk group array.

9. The method of claim 1 wherein said automated tests are comprised of echo tests for testing echo cancellers connected to each respective switch.

10. The method of claim 1 further comprising the steps of:
- writing said particular time slots for said designated tests to a plurality of files corresponding to said testing units; and
- transferring each of said files to a respective testing unit.

11. A telecommunication network comprising:
- a plurality of switches;
- a plurality of trunk groups wherein each trunk group interconnects a respective pair of said switches and wherein each trunk group comprises a plurality of trunk circuits;
- a plurality of testing units, wherein each testing unit is connected to a respective switch for testing a predetermined aspect of performance associated with said switch, and wherein each testing unit conducts a predetermined automated test in conjunction with each trunk group connected to its respective switch and in conjunction with another switch and testing unit connected to said trunk group; and
- a main controller for scheduling a plurality of said predetermined automated tests to cover said telecommunications network, wherein said main controller:
  - creates a time slot array representing a plurality of potentially available time slots for conducting said automated tests;
  - marks a subset of said time slots as unavailable according to a plurality of respective maintenance windows corresponding to said switches;
  - marks a remainder of said time slots as available;
  - sequentially selects each of said trunk groups for respectively scheduling said automated tests;
  - initializes a counter after selecting a respective trunk group;
  - identifies a particular time slot marked as available in said array for both of said testing units corresponding to said respective trunk group;
  - marks said particular time slot as unavailable for both of said corresponding testing units;
  - sequentially selects each trunk circuit within said respective trunk group;
  - designates a respective test for a selected trunk circuit during said particular time slot;
  - increments said counter;
  - checks whether said counter indicates that a number of said tests have been scheduled that fills a capacity of said testing units for running simultaneous tests;
  - if said capacity is not filled, then repeats said designating step for a next selected trunk circuit using said particular time slot; and
  - if said capacity is filled, then identifies a further time slot marked as available in said array for both of said testing units corresponding to said respective trunk group, marks said further time slot as unavailable for both of said corresponding testing units, and repeats said designating step for a next selected trunk circuit using said further time slot.

12. The network of claim 11 wherein said switches are located in a plurality of time zones, wherein said time slots in said time slot array are organized according to an absolute time reference, and wherein said maintenance windows appear in said time slot array in accordance with a time zone where each particular switch is located.

13. The network of claim 11 wherein said designation of a respective test includes designating an originating testing unit.

14. The network of claim 13 wherein said originating testing unit is alternately designated between each of said testing units corresponding to said respective trunk group when designating said respective tests for said trunk circuits within said selected trunk group.

15. The network of claim 11 wherein said trunk circuits within said respective trunk group are identified by substantially consecutive trunk numbers, and wherein said designation of a respective test includes designating a test direction between said testing units that is determined in response to a trunk number being even or odd.

16. The network of claim 15 wherein said test direction comprises a first direction when a respective trunk number is even and a second direction opposite said first direction when a respective trunk number is odd.

17. The network of claim 16 wherein a repeat scheduling of automated tests for all of said trunk groups is performed for a time slot array covering a later date, and wherein said test direction for said repeat scheduling is comprised of said first direction when a respective trunk number is odd and said second direction when a respective trunk number is even.

18. The network of claim 11 wherein said trunk groups are selected from a trunk group array, and wherein said main controller determines a ranked order of said switches, collects identities of all trunk groups coupled from a switch of a lower ranked order to a switch of a higher ranked order, and adds each collected trunk group identity to said trunk group array.

19. The network of claim 11 wherein each of said switches is connected to a plurality of echo cancellers and wherein said automated tests are comprised of echo tests.

20. The network of claim 11 wherein said main controller writes said is particular time slots for said designated tests to a plurality of files corresponding to said testing units and transfers each of said files to a respective testing unit.

* * * * *